(No Model.)
J. W. GIBBONEY.
ENVELOPE FASTENER.
No. 478,538. Patented July 5, 1892.
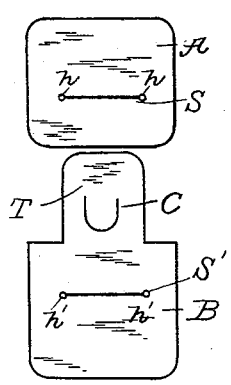
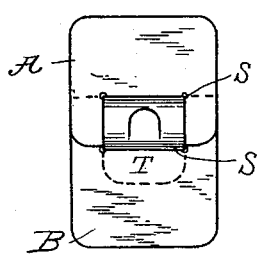
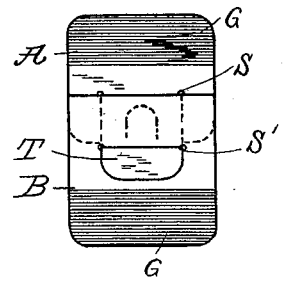
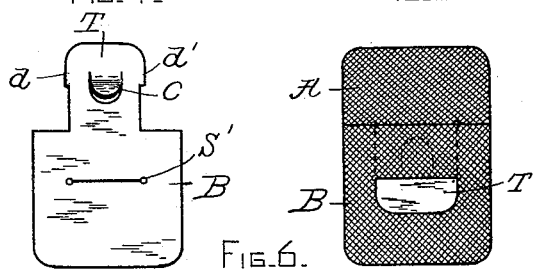
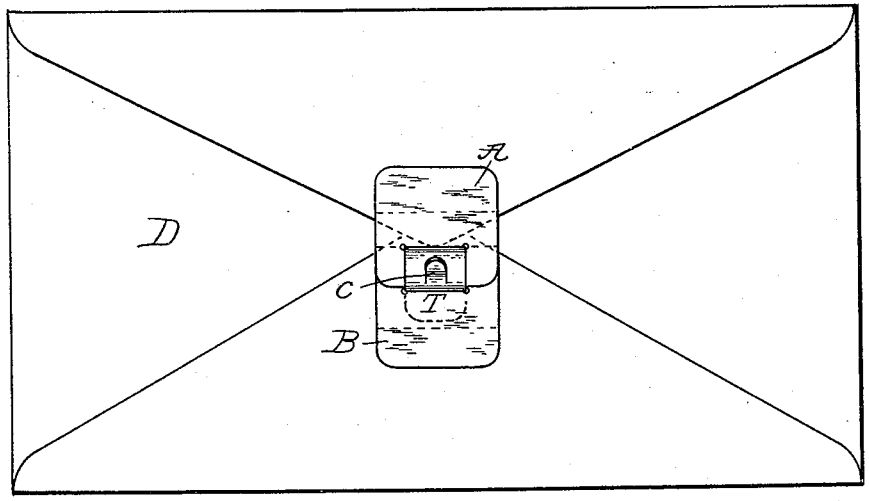
WITNESSES.
A. F. Macdonald.
John T. Broderick.
INVENTOR
John W. Gibboney

UNITED STATES PATENT OFFICE.

JOHN W. GIBBONEY, OF LYNN, MASSACHUSETTS.

ENVELOPE-FASTENER.

SPECIFICATION forming part of Letters Patent No. 478,538, dated July 5, 1892.

Application filed February 4, 1892. Serial No. 420,295. (No model.)

*To all whom it may concern:*

Be it known that I, JOHN W. GIBBONEY, a citizen of the United States, and a resident of Lynn, in the county of Essex and Commonwealth of Massachusetts, have invented a new and useful Improvement in Envelope-Fasteners, of which the following is a specification.

The object of my invention is to secure a cheap and effective fastener, which may be applied to envelopes and wrappers for third and fourth class mail-matter or for securing paper coverings upon packages of various kinds in such manner that they may be readily opened to give access to the contents.

The improved fastener of my invention is made of some strong, tenacious, flexible material, such as a tough variety of paper or a paper which is provided with a cloth or other strong material, which is attached to it in a suitable fashion. Such a fastener is illustrated in the accompanying drawings, in which—

Figure 1 represents the two parts of my fastener. Fig. 2 shows the parts in their engaged position. Fig. 3 is a view of the reverse side of the fastener. Fig. 5 illustrates one of the preferred constructions of the same. Fig. 4 is a modification, and Fig. 6 shows how the fastener is secured in position upon the object to which it is attached.

In Fig. 1, A is the first part of my fastener. It is shown as almost square in form, and near one edge it is provided with a slot S. The second piece B has a body portion, which preferably, though not necessarily, conforms in shape to the part A. It has a tongue T extending from one side of a breadth, adapting it to pass through the slot S in the piece A. The piece B is also provided with a slot S' of about the same size as the slot S, and in some cases a smaller tongue C is provided in the tongue T, extending toward the body part B. Small holes $h$ $h$ $h'$ $h'$ at the ends of the slots S S' may be provided, if desired, and if the fastener is made of ordinary tough paper will prevent the tearing of the same when the fastener is subjected to strain.

The two parts of the fastener are engaged as in Fig. 2. The tongue T is passed through the slot S from the under side, after which it is passed through the slot S', and the whole is then pressed downward to make it flat. There are then no projecting ends or edges to catch in other mail-matter or other objects and cause trouble thereby. In this position of the tongue T it will, if it has been properly constructed, resist the separation of the parts A and B until the strain becomes great enough to tear the fastener, and if the fastener is made of proper materials—such as a strong Manila paper, Japanese rice paper, or other strong paper, or paper which has been strengthened with cloth attached to it—it will suffice for all ordinary purposes where such a fastener is required. To open the fastener, it is only necessary to remove the tongue T from under the part B and withdraw it from the slot S. To render this easy of accomplishment, I prefer to provide the small tongue C in the tongue T, which can readily be grasped by the hand when it is desired to withdraw the tongue T. The tongue C is preferably made with its free end extending toward the body portion B when the parts are engaged or in a direction opposite that of the tongue T, so that when the latter is passed through the slot S the tongue C will also readily pass through and when the tongue T is withdrawn from the slot S the tongue C can easily be pressed into the same plane with the tongue T to prevent its catching on the edges of the slot S.

In Fig. 3 similar letters refer to the same parts as in the former figures. This shows the reverse side of the fastener, and at the ends the shaded portions G G represent gummed portions or adhesive material by which the fastener is secured to the envelope or wrapper.

In Fig. 4 I have shown the tongue T provided with catches $d$ $d'$, which when the tongue is passed through the slot S' engage the edges of the slot, thus preventing accidental disengagement of the parts, while allowing removal when the tongue C is pulled upon.

In Fig. 5 is shown the reverse side of my fastener, as in Fig. 2. The intersecting lines represent cloth, and this may be secured to the paper in such manner as will insure it against being torn readily when strained. Such a paper as is commonly employed in making strong envelopes at the present time may be used for this purpose.

In Fig. 6 there is shown my fastener in position on an envelope to which it is applied. The gummed portions G G, Fig. 3, having been moistened or a suitable adhesive material having been applied to such portion of the fastener, it is secured to the envelope, one part—such as A—to the flap of the envelope and the other part—such as B—to the body of the envelope. The two parts are of course in their engaged position when attached to the envelope, so that such parts will be in proper operative relation for opening and closing the envelope.

The portions G G of the parts of my fastener to which the adhesive material or substance is applied may, of course, be of any size or shape desired to suit the conditions.

The fastener of my invention, being made of exceedingly cheap materials and consisting of but two parts, is far less costly to manufacture than those fasteners made of metal and paper secured together in various ways, and it is also far cheaper to use the fastener of my invention in connection with ordinary envelopes or with packages wrapped in ordinary paper, to which the fastener is applied, than to use special envelopes provided with fasteners attached thereto for such purposes. The machinery required, also, for the manufacture of the fastener of my invention is simple and not expensive, and I am therefore enabled to effect a very considerable economy in this respect.

While I have shown the tongue C in connection with the tongue T in all of the figures of the drawings, I desire it to be understood that it is not a necessary feature of my invention, but is shown as a preferred construction of the same.

What I claim as my invention is—

1. As a new article of manufacture, an envelope-fastener consisting of two separable parts A and B, each made of a fibrous flexible material, such as paper or a cloth-backed paper, a slot S in the part A, a tongue T, extending from the part B and adapted to pass through the slot in the part A, a slot S' in the part B, through which the free end of the tongue T may be passed under the part B and be pressed flat, and an adhesive gum on the surfaces of the parts A and B, whereby they may be attached to a wrapper or envelope in their engaged relation, substantially as shown and described.

2. An envelope-fastener consisting of two parts, each made of a flexible material, such as paper, a tongue formed integral with one part adapted to pass through a slot in the other part, and a slot in the tongued part, through which the free end of the tongue may be tucked under the body portion of such part and lie flat, as set forth.

3. The combination, in a separable envelope-fastener, of two parts, each made of a flexible fibrous material, such as paper, a tongue extending from one part and adapted to pass through a slot in the other part, a slot in the tongued part, through which the free end of the tongue may be tucked under the body of such part and be pressed flat, and an adhesive substance for securing said two parts to the envelope or wrapper.

Signed at Lynn, Massachusetts, February 1, 1892.

JOHN W. GIBBONEY.

Witnesses:
BENJAMIN B. HULL,
JOHN T. BRODERICK.